United States Patent [19]

Nordby et al.

[11] Patent Number: 5,736,823
[45] Date of Patent: *Apr. 7, 1998

US005736823A

[54] CONSTANT AIR FLOW CONTROL APPARATUS AND METHOD

[75] Inventors: Craig J. Nordby, Chesterfield; J. Stephen Thorn; James L. Skinner, both of Florissant, all of Mo.

[73] Assignee: Emerson Electric Co., St. Louis, Mo.

[*] Notice: The term of this patent shall not extend beyond the expiration date of Pat. No. 5,447,414.

[21] Appl. No.: 444,440

[22] Filed: May 19, 1995

Related U.S. Application Data

[63] Continuation-in-part of Ser. No. 250,296, May 27, 1994, Pat. No. 5,447,414.

[51] Int. Cl.$^6$ .................................................. F04B 49/06
[52] U.S. Cl. .................... 318/432; 388/815; 388/929; 388/930; 417/20; 417/42; 417/44.1; 417/44.11
[58] Field of Search ...................... 318/432–434, 318/443, 644; 388/809–815, 907.5, 929–930; 417/20, 42, 44.1, 44.11, 53

[56] References Cited

U.S. PATENT DOCUMENTS

| | | | |
|---|---|---|---|
| 4,467,706 | 8/1984 | Batcheller et al. | 98/1.5 |
| 4,496,845 | 1/1985 | Ensign et al. | 290/43 |
| 4,554,492 | 11/1985 | Karpowicz et al. | 318/309 |
| 4,638,233 | 1/1987 | Erdman | 318/644 |
| 4,806,833 | 2/1989 | Young . | |
| 4,933,614 | 6/1990 | Kawata | 318/432 |
| 4,978,896 | 12/1990 | Shah | 318/254 |
| 5,019,757 | 5/1991 | Beifus | 318/254 |
| 5,163,818 | 11/1992 | Betsill et al. | 417/18 |
| 5,202,951 | 4/1993 | Doyle | 388/811 |
| 5,269,660 | 12/1993 | Pradelle | 417/18 |
| 5,447,414 | 9/1995 | Nordby et al. | 417/20 |
| 5,456,231 | 10/1995 | Suzuki et al. | 123/399 |

FOREIGN PATENT DOCUMENTS 1381675  3/1988  U.S.S.R.

*Primary Examiner*—David S. Martin
*Attorney, Agent, or Firm*—Polster, Lieder, Woodruff & Lucchesi

[57] ABSTRACT

Air handling apparatus (10) delivers a volume of air at a generally constant flow rate regardless of changes in the operating conditions of a system with which the apparatus is used. A blower (12) pushes air from one point to another. The blower is operated by a blower motor (14). A switch (16) controls application of power to the motor. Sensors (20) are used to sense the current drawn by the motor and the motor's operating speed. A flow controller (22) establishes a desired air flow rate to be provided by the blower. A processor (18) is responsive to the sensed current (I), motor speed (S), an input (C) from the flow controller, and constants (K1–K4) related to performance characteristics of the blower to determine a torque required by the motor to produce a predetermined air flow rate. The torque value is determined as a function of the combined motor speed input from the sensor and an input from the flow controller. The processor is responsive to the calculated torque value for the motor to supply a control signal to the switch to control application of a voltage to the motor. This voltage is sufficient for the motor to produce the calculated torque. The processor includes signal logic (28) by which the control signal can be modified first in response to the sensed current drawn by the motor.

19 Claims, 3 Drawing Sheets

CONSTANT CALCULATION EXAMPLE

| DATA POINTS | | |
|---|---|---|
| SPEED | CFM | TORQUE |
| 600 | 1400 | 25 |
| 1040 | 1400 | 38 |
| 300 | 800 | 7.5 |
| 590 | 800 | 12 |

| A MATRIX | | | |
|---|---|---|---|
| SPEED*CFM | SPEED | CFM | OFFSET |
| 840000 | 600 | 1400 | 1 |
| 1456000 | 1040 | 1400 | 1 |
| 240000 | 300 | 800 | 1 |
| 472000 | 590 | 800 | 1 |

| A INVERSE | | | |
|---|---|---|---|
| -3.8E-06 | 3.79E-06 | 5.7E-06 | -5.7E-06 |
| 0.00303 | -0.00303 | -0.00875 | 0.008046 |
| 0.003939 | -0.00227 | -0.00339 | 0.001724 |
| -3.15152 | 1.818182 | 4.747126 | -2.41379 |

| CONSTANTS |
|---|
| K1= 2.34E-05 |
| K2= -0.00319 |
| K3= 0.00738 |
| K4= -3.05904 |

CONSTANT AIR FLOW CONTROL APPARATUS AND METHOD

BACKGROUND OF THE INVENTION

This application is a continuation-in-part of U.S. Pat. application 08/250,296, filed May 27, 1994, issued as U.S. Pat. No. 5,447,414.

This invention relates to air flow control in air handling systems such as heating and cooling systems and, more particularly, to apparatus for providing a constant air flow by a blower used in such systems.

Heating and cooling systems, particularly residential systems are well-known. Such systems commonly employ a blower to push warm or cold air through a duct system depending upon whether the residence is being heated or cooled. The blower is motor operated. The air flow system is designed to operate under a wide variety of conditions which include the volume of space to be heated or cooled, the temperature of the environment, the size and type of ducting used, duct restrictions, etc. One desirable feature of these air handling systems is that they be capable of providing a constant flow rate of air under a wide range of conditions. One method of achieving this constancy is to control operation of the blower motor so its operation varies in response to sensed changes in the system or its operating environment. There are a variety of control schemes which have been employed to control motor operation. Each of these schemes employ a different methodology depending upon the particular desired operating characteristics of the system.

In U.S. Pat No. 4,978,896, for example, a blower's speed is controlled over a range of static pressure changes to maintain a constant flow rate. A microprocessor is responsive to a preselected flow rate signal and a motor speed signal to generate a motor torque value. A pulse width modulated (PWM) signal is produced by the microprocessor and used to control motor speed so the calculated mount of torque is produced by the motor, enabling the motor to drive the blower at a variable rate which will provide the desired constant air flow rate even though operating conditions change. Co-assigned U.S. Pat. No. 5,019,757 discloses a similar operating scheme but incorporates a comparison function by which the motor's rpm is compared with a calculated target speed with any difference used to adjust an output of the microprocessor to refine the level of control.

Another co-assigned U.S. Pat No. 4,806,833 describes an air conditioning system in which the blower speed is established to provide a constant volume of air flow for an existing static pressure. The blower speed is subsequently changed in response to changes in the static pressure.

Finally, U.S. Pat. No. 4,476,706, for example, describes an environmental control sytem. The embodiment described is for a tractor cab having two separate blowers, a pressurization blower, and a recirculation blower. The pressurization blower, at constant air flow, is similar to that described in the above co-assigned patents. The occupant of the cab selects the control level of the recirculation blower. The control circuitry is responsive to changes within the cab pressure and system flow restrictions which occur, for example, when an air filter in the system begins to clog up, to maintain a constant flow rate.

Generally, it is a feature of these systems that air flow control, and the maintenance of a constant flow rate of air is a function of motor torque. However, the relationship is not exact, and because of this, the level of control to maintain a desired constant air flow rate, while generally achieved, is not achieved to the greatest extent possible. Also in this regard, control methodologies employing adjustment of the motor's torque/speed characteristics provide some type of compensation (i.e., gain) in the circuitry used to provide motor drive signals. The gain value used is typically a compromise; and, as a result, is generally insufficient for high flow rates of air, and excessive for lower air flow rates.

SUMMARY OF THE INVENTION

Among the several objects of the present invention may be noted the provision of a method and apparatus for moving air through an air handling system such as a heating or air conditioning system; the provision of such a method and apparatus to provide a constant air flow rate under varying operating conditions; the provision of such a method and apparatus to maintain the air flow rate as a function of the speed and torque of a motor used to operate a blower of the system; the provision of such a method and apparatus to develop a motor control signal for use in operating the motor which is also a function of various blower operating characteristics; the provision of such a method and apparatus in which the blower characteristics include speed, torque, pressure, and air flow characteristics of the blower; the provision of such a method and apparatus to include an offset torque value proportional to a desired air flow rate; the provision of such method and apparatus to incorporate a double linear approximation whereby the resulting control signal provides better control than is possible in existing motor control systems; the provision of such a method and apparatus employing a novel torque calculation formula incorporating the blower characteristics outlined above and allowing the resultant torque control signal to be modifiable; the provision of such a method and apparatus to include a microprocessor which periodically calculates the required motor torque and generates an appropriate control signal; and, the provision of such a method and apparatus which provides a low cost, reliable motor control which is readily adaptable to a wide variety of air handling systems and motor/blower configurations.

In accordance with the invention, generally stated, air handling apparatus is for delivering a volume of air at a generally constant flow rate regardless of changes in the operating conditions of an environment with which the apparatus is used. A blower pushes air from one point to another. The blower is operated by a blower motor. A set of switches controls application of power to the motor. Sensors are used to sense, either directly or indirectly, the current drawn by the motor, and the motor's operating speed. A flow controller establishes a desired air flow rate to be provided by the blower. A processor is responsive to the speed, as well as an input from the flow controller, to determine a torque required by the motor to produce a predetermined air flow rate. The torque value is determined as a function of the combined motor speed input from the sensor and an input from the flow controller. The processor, which may include a microprocessor, is responsive to the calculated torque value for the motor to supply a control signal to the switches to control application of a voltage to the motor, this voltage being sufficient for the motor to produce the calculated torque. A method of motor control to produce a constant air flow rate is also disclosed. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
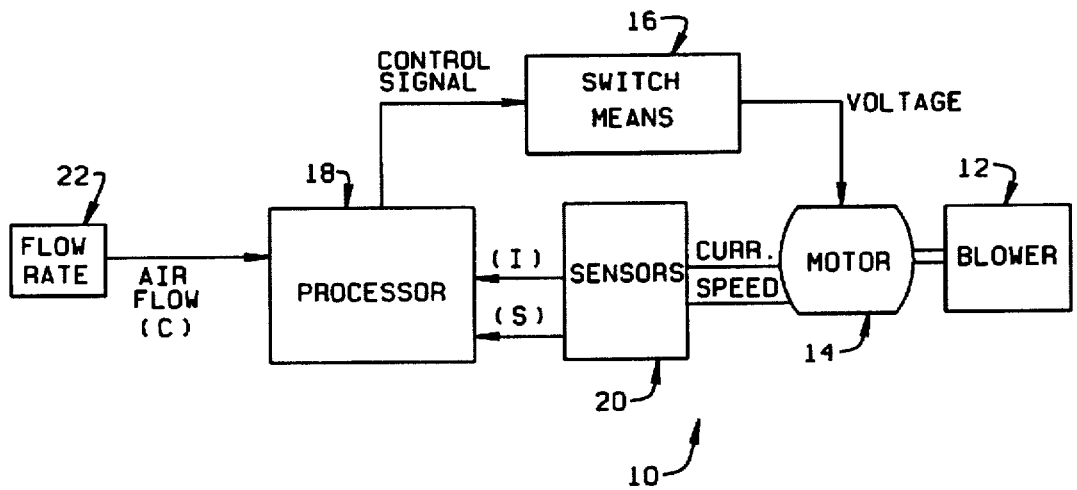
FIG. 1 is a block diagram of apparatus of the present invention for controlling operation of a blower to provide a constant flow rate.

Referring to the drawings, air handling apparatus of the present invention is indicated generally 10 in FIG. 1. Apparatus 10 may be used for delivering hot, cold, or ambient air from one point to another. Apparatus 10 delivers a volme of air at a generally constant flow rate regardless of changes in the operating conditions of the systems or the environment in which the apparatus is used. Apparatus 10 first includes a blower 12 for moving air from a heater or air conditioner to a desired location. The delivery rate of blower 12 is typically expressed in cubic feet per minute (CFM). A blower motor 14 is operatively connected to blower 12 for operating the blower. In the preferred embodiment, motor 14 is a brushless D.C. motor. Other motor types are compatible with the invention. For example, motor 14 may be a switched reluctance motor, or a conventional single-phase or polyphase motor may be employed without departing from the scope of the invention.

Voltage to the motor is supplied through a switch means 16. Means 16 controls application of power to blower motor 14 in response to control signal inputs from a processor means 18 described hereinafter. When voltage is supplied to the motor, it also draws a current and nms at a particular speed. A sensing means 20 senses the current drawn by the motor and the motor's operating speed. As will be appreciated by those skilled in the art, sensing means 20 may comprise any of a variety of devices or circuits used to obtain the desired information. Each of these motor operating parameters is converted to a signal supplied as an input to processor means 18. Processor means 18 is also provided an input from a flow control means 22. Means 22 is, for example, a manually operated switch having a plurality of switch positions by which the user can select a desired flow rate of air to be provided by the apparatus. Again, other devices may be used, if desired. Once a desired air flow rate is established, apparatus 10 continues to provide that volume of air even though various changes in system conditions occur.

Processor means 18 is responsive to the current and motor speed inputs from each sensor comprising sensing means 20 as well the air flow input from the flow control means 22. Processor means 18 then periodically determines the torque required by motor 14 to produce the predetermined air flow rate. Means 18, for example, makes this determination 65 times/second. The torque calculation performed by the processor means is a function of a combined motor speed input S from sensing means 20, and an input C from flow control means 22. In addition, speed, torque, pressure, and air flow characteristics of the blower are used in making the torque calculation. Processor means 18 is responsive to a calculated torque value for the motor 14 to supply a control signal to switch means 16 to control application of voltage to the motor. Switch means 16 is preferably a bridge-type inverter arranged in a conventional configuration when applied to a multiple phase winding configuration for motor 14. Other switch configurations may be used, depending upon the motor configuration. The voltage supplied to motor 14 is sufficient for the motor to produce the calculated torque by which the blower will turn at the correct speed, for a current set of operating conditions, to deliver a desired flow of air.

Figure 2:
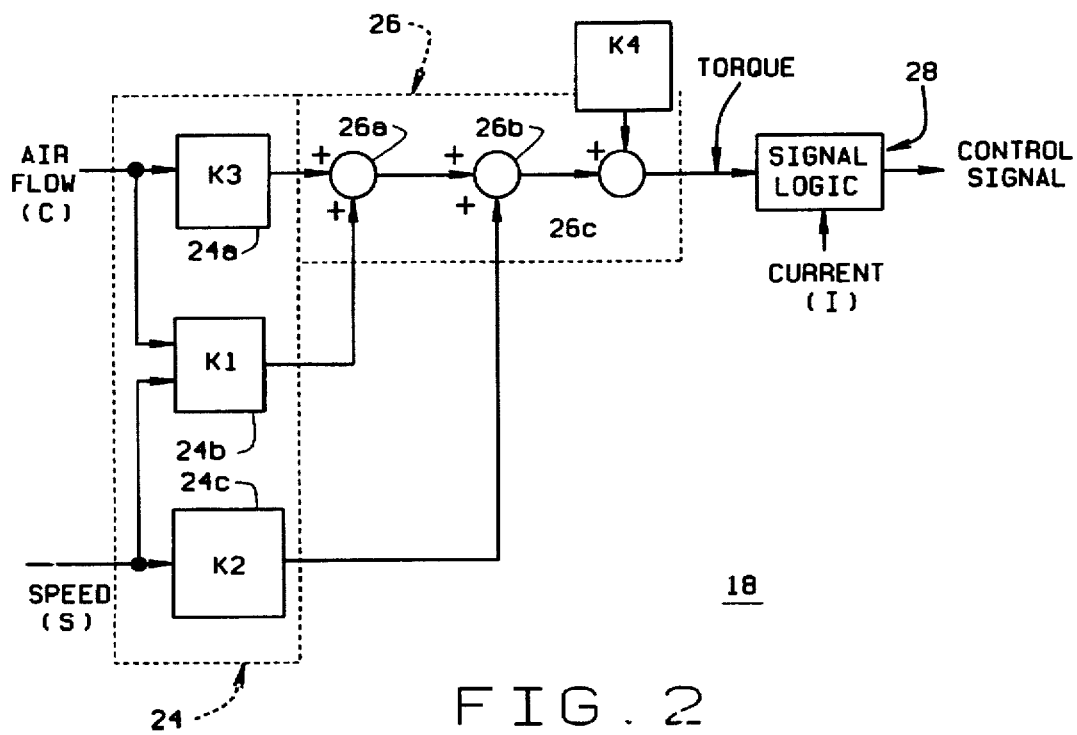
FIG. 2 is a block diagram of a processing means of the apparatus.

Referring to FIG. 2, processor means 18, which can be a microprocessor appropriately programmed, calculates the required torque as:

$$\text{torque} = (K1*S*C) + (K2*S) + (K3*C) + K4, \quad (1)$$

where S is the motor speed input from sensing means 20, and C the air flow rate input from flow control means 22. K1–K4 are constants which are derived for the particular blower 12 operated by motor 14 and which represent air flow, torque, pressure, and speed characteristics of the blower, for example. Processor means 18 includes multiplier means 24 to which the respective inputs C and S from the flow control means and the sensing means are supplied. Multiplier means 24 includes a plurality of multipliers 24a–24c for respectively combining these inputs with certain of the blower constants. Input signal C from flow control means 22 is supplied as an input to both multiplier 24a, and multiplier 24b. Input signal S from sensing means 20 is supplied as an input to multiplier 24c, and also as an input to multiplier 24b. In multiplier 24a, the flow control means input C is combined with the constant K3. In multiplier 24b, flow control input C and motor speed input S are combined with each other and with the constant K1. Finally, in multiplier 24c, motor speed input S is combined with constant K2.

Next, processor means 18 includes a summing means indicated generally 26 for additively combining the outputs from the respective multipliers. A first summing means 26a additively combines the output from multipliers 24a, 24b. The output from the summing means is a value (K1*C*S) +(K3*C). At a second summing means 26b, the output from summing means 26a is additively combined with the output of multiplier 24c. The output from this summing means is (K1*S*C)+(K2*S)+(K3*C). Finally, at a third summing means 26c, the output of summing means 26b is additively combined with the constant K4. The output from summing means 26c represents the required motor torque, for the desired air flow and current operating speed of the motor, necessary for blower 12 to maintain a constant flow rate. Means 18 includes a signal logic 28. The output from summing means 26 is supplied to this signal logic where it is combined with the motor current signal supplied by sensing means 20. The output from the signal logic is a control signal supplied to switch means 16. The switch means is responsive to this input from the processor means to control the time and the amplitude of a voltage supplied to the motor in order for the motor to produce the requisite torque applied to blower 12.

Figure 3:
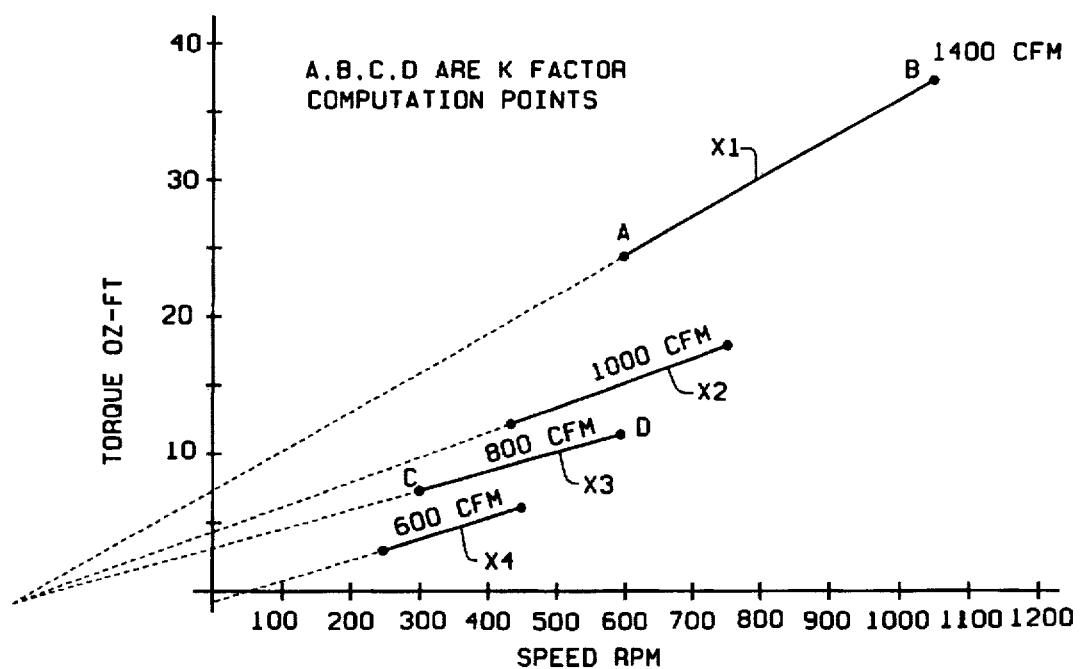
FIGS. 3 and 4 are torque/speed curves for a representative blower with which the apparatus is used; and, FIG. 5 is a data representation and calculation to determine constants used in a motor torque equation employed in the apparatus.
Figure 4:
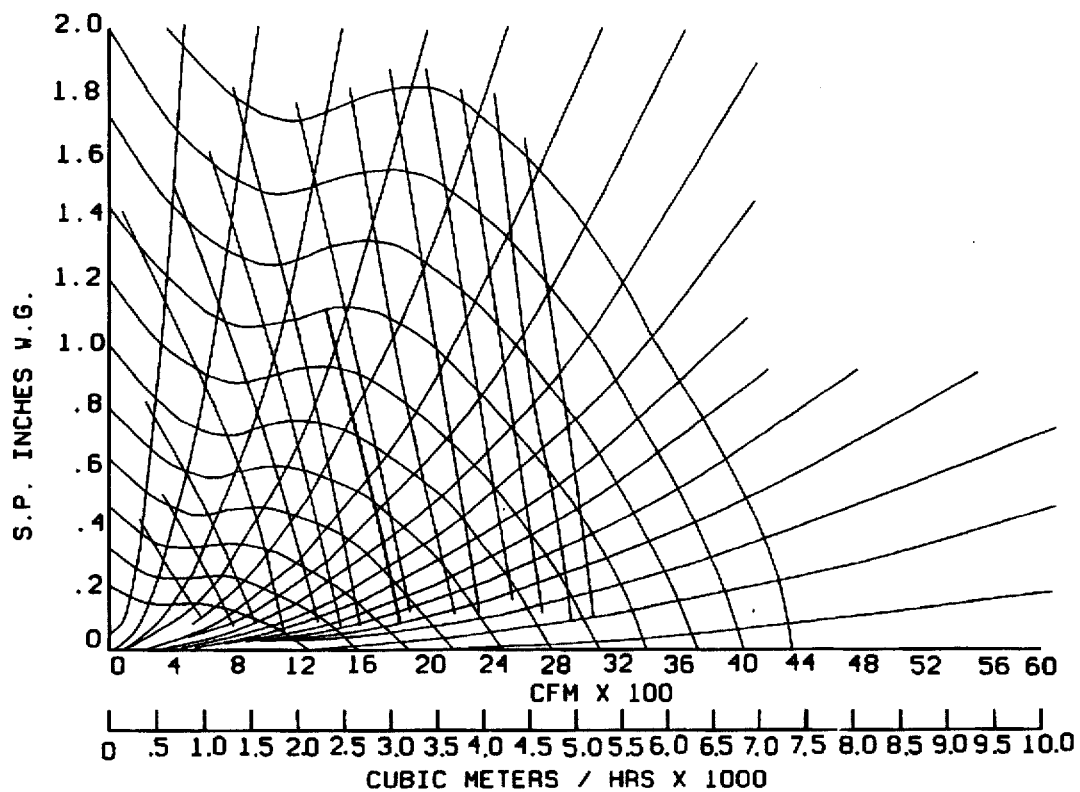

In developing the constant values for use in the above torque equation, it will be understood that constant values can be derived for a wide range of blowers and these values are maintained in a schedule or look-up table accessed by the microprocessor. The constants are derived by performing a double linear approximation from the torque/speed curves for a blower. In FIG. 4, static pressure/air flow curves for a representative blower are shown. FIG. 3 shows the corresponding torque/speed curves for the blower curves of FIG. 4. As shown in FIG. 3, the constant air flow characteristics can be approximated by a straight line. The result is that the family of lines can be mathematically approximated using a double linear approximation. This double linear approximation is important because in many existing air handling systems, a gain value is used as part of the control strategy for the motor/blower. The gain value represents blower performance characteristics and is usually a single value based upon a midpoint of blower characteristics. As such, it is generally too low for upper end blower performance, and too high for lower end air flow rates.

To determine the constants K1–K4 to be used in the torque equation, a plot of constant cubic feet per minute (CFM) curves is made and these are then approximated by straight lines such as the approximations or line segments X1–X4 in FIG. 3 for 1400, 1000, 800, and 600 CFM respectively. Each CFM line segment has a different slope. In each instance, the line segment can be plotted using the equation $$T = mS + b, \qquad (2)$$

where T is torque, S is motor speed, m is the slope of the curve, and b is the torque offset. In each instance, the segments X1–X4 have a different torque offset and slope. Making the further approximation that both the slope and the offset of T are linear functions of CFM yields $$m = K1 * C + K2, \text{ and,} \qquad (3)$$

$$b = K3 * C + K4, \qquad (4)$$

where K1–K4 are constants determined from the blower characteristics curves. Combining these relationships produces equation (1) above.

In determining the value of the constants, points are selected from curves for the blower or from actual blower and air handler tests. The points can be selected at four respective points representing boundaries of an operational envelope for the blower. It will be understood that depending upon the application and system in which the blower is used, these points can vary or more than four points can be used. Four separate equations each involving four separate unknowns are then developed. Simultaneous solution of these equations produce the respective values for the constants K1–K4. Once this is done, error calculations can be performed to determine the percentage of error in the torque calculation.

As an example, an initial set of data and the results of the calculations are shown in FIG. 5. As shown therein, the points for determining the constants are

| Speed (RPM) | CFM | Torque (Oz.-Ft.) |
| --- | --- | --- |
| 600 | 1400 | 25 |
| 1040 | 1400 | 38 |
| 300 | 800 | 7.5 |
| 590 | 800 | 12 |

These points are taken from the X1 and X3 line segments shown in FIG. 3.

What has been described is a method and apparatus for moving air through an air handling system including a variety of heating and air conditioning systems. It is a feature of the method and apparatus of the invention to provide a constant air flow rate under varying operating conditions. According to the method of the invention and the apparatus described, the air flow rate of the system is maintained as a function of the speed and torque of a motor used to operate a blower of the system. A motor torque signal is generated and used to operate the motor is also generated as a function of various blower operating characteristics which include the blower's speed, torque, pressure, and air flow characteristics. These vary from one blower to another. The methodology used incorporates a double linear approximation. The resulting control signal provides better control than is possible in existing motor control systems. The method and apparatus of the invention employ a novel torque calculation formula which incorporates the blower speed, torque, pressure and air flow. A microprocessor incorporated in the apparatus periodically calculates the required motor torque and generates an appropriate control signal. The result is a low cost, reliable motor control which is readily adaptable to a wide variety of air handling systems and motor/blower configurations.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In an air handling system for delivering air by a blower system using a blower and a blower motor running the blower, apparatus for producing a constant flow rate of air from the blower comprising:

sensing means for sensing the operating speed of the motor sensing means for sensing the current drawn by the motor;

switch means controlling application of power to the motor;

flow control means establishing a desired air flow rate; and, processor means responsive to inputs from the respective sensing means and the flow control means to calculate a torque to be produced by the motor for a predetermined air flow rate, the torque being determined as a function of the speed input from the sensing means and an input from the flow control means and air flow, pressure, torque, and current characteristics of the blower, the processor means combining a calculated torque value with a current input from the sensing means to produce a control signal supplied to the switch means to control application of a voltage to the motor, the voltage supplied to the motor being sufficient for the motor to produce the calculated torque.

2. The apparatus of claim 1 wherein the processor means calculates the torque to be produced by the motor according to a formula combining a value representing motor speed, a value representing a desired air flow, and values representing operating characteristics of the blower.

3. The apparatus of claim 2 wherein the processor means calculates torque in accordance with the equation $$\text{torque} = (K1*S*C) + (K2*S) + (K3*C) + K4,$$

where S represents motor speed, C represents desired air flow, and K1, K2, K3, and K4 are constants representing air flow, torque, pressure, and speed characteristics of the blower.

4. The apparatus of claim 3 wherein the processor means comprises a microprocessor for calculating the required motor torque to maintain a desired air flow rate, the microprocessor including first and second multiplier means to which the the flow control means input is supplied, a third multiplier means to which the motor speed input from the sensing means is supplied, the speed input from the sensing means also being an input to the second multiplier means,

7 the first multiplier means multiplying the flow control means input by one of the constants, the second multiplier means combining the respective speed input and flow control means input and multiplying the result by a second of the constants, and the third multiplier means multiplying the speed input by a third of the constants.

5. The apparatus of claim 4 further including summing means for summing the respective outputs of the multiplier means and a fourth constant to produce a motor torque signal.

6. The apparatus of claim 5 further including signal logic means to which the motor torque signal and the current signal from the sensing means are supplied as inputs, the signal logic means being responsive to these inputs to produce a control signal supplied to the switch means.

7. Air handling apparatus for delivering a volume of air at a generally constant flow rate regardless of changes in the operating conditions of an environment with which the apparatus is used comprising:

a blower for moving air from one point to another, and a blower motor for running the blower;

switch means for controlling power supplied to the motor;

sensing means for sensing the motor's operating speed;

sensing means for sensing the current drawn by the motor;

flow control means for establishing a desired air flow rate; and, processor means responsive to the sensed operating speed and motor current, and an input from the flow control means to determine a torque required by the motor to produce a desired air flow rate, the torque being determined as a function of the motor speed, the flow control means input, and speed, torque, pressure, and air flow characteristics of the blower, the calculated torque including an offset value, and the processor means including means responsive to the calculated torque and the motor current to produce a control signal supplied to the switch means to control application of a voltage to the motor for the motor to produce the calculated torque.

8. The air handling apparatus of claim 7 wherein the processor means calculates the required torque as $$torque = (K1*S*C) + (K2*S) + (K3*C) + K4,$$

where S represents motor speed, C represents a desired air flow rate input from the flow control means, and K1–K4 are blower constants derived from torque/speed curves for the blower and using an approximation based on the curves.

9. The air handling apparatus of claim 8 wherein the processor means includes multiplier means to which respective inputs from the flow control means and the sensing means are supplied, the multiplier means including a plurality of multipliers for respectively combining the inputs from the flow control means and sensing means together with the constants for the blower.

10. The air handling apparatus of claim 9 wherein the multiplier means includes first and second multipliers to which the flow control means input is supplied, and a third multiplier to which the sensing means input is supplied, the sensing means input also being supplied as an input to the second multiplier, the first multiplier multiplying the flow control means input by one of the constants, the second multiplier combining the flow control means and sensing means inputs and multiplying the result by a second constant, and the third multiplier multiplying the sensing means input by a third constant.

11. The air handling apparatus of claim 10 further including summing means for summing the results supplied as

8 outputs from the respective multiplier means, the summing including first summing means for summing the outputs from the first and second multiplier means, a second summing means for summing the output of the first summing means with an output from the third multiplier means, and third summing means for summing an output of the second summing means with a fourth of the constants.

12. The air handling apparatus of claim 11 wherein the processor means further includes feedback means for combining the current output of the sensing means with an output of the multiplier means to produce the control signal supplied to the switch means.

13. The air handling apparatus of claim 12 wherein the processor means includes a microprocessor.

14. A method of controlling the operation of a blower motor in an air handling system to provide a desired flow rate of air which is substantially constant over a wide range of operating conditions comprising:

sensing the current drawn by the motor and providing an output signal representative thereof;

sensing the output speed of the motor and providing an output signal representative thereof:

establishing a predetermined air flow rate and providing a flow rate signal representative thereof;

processing the motor speed signal and flow rate signal to determine a torque required by the motor for the predetermined airflow rate, processing of the motor speed and flow rate signals including combining the values represented by the motor speed and flow rate signals with values representing the air flow, pressure, and speed characteristics of the blower, the torque value determined including an offset torque value; and generating a control signal and supplying the control signal to a switch means for the switch means to supply a voltage to the motor sufficient for the motor to produce the requisite torque; generating the control signal including combining the torque value with the value representing motor current to produce the control signal, controlling operation of said blower motor using said control signal maintaining a constant air flow rate in the system regardless of changes therein.

15. The method of claim 14 wherein processing the motor speed signal and flow rate signal includes calculating the required torque in accordance with the equation $$torque = (K1*S*C) + (K2*S) + (K3*C) + K4,$$

where S is a motor speed input signal from the sensing means, C is an air flow rate input signal from the flow control means, and K1–K4 are constants for the particular blower operated by the motor representing the blower's air flow, torque, pressure, and speed characteristics of the blower.

16. The method of claim 15 wherein combining the motor speed signal with the flow rate signal includes multiplying the flow rate signal together with one of the constants, multiplying the speed control signal together with a second of the constants, multiplying the speed control signal together with the flow rate signal and one of the constants.

17. The method of claim 16 further including combining the results of the multiplications together with a constant to produce the control signal supplied to the switch means.

18. A method of controlling the operation of a blower motor used in an air handling system to provide a substantially constant air flow rate over a wide range of operating conditions, the blower having a predetermined set of operating characteristics to move the air, and the blower being operated by the blower motor to which a voltage is supplied, the method comprising:

sensing a current drawn by the motor and the motor's operating speed, and providing output signals representative thereof;

establishing a desired air flow rate and providing a flow rate signal representative thereof;

deriving a set of constant values representing the blower's operational characteristics torque/speed curves for the blower;

processing the motor speed signal and flow rate signal to determine a torque required to be produced by the motor for the desired air flow rate, processing the motor speed and flow rate signals including calculating the required torque according to the equation $$\text{torque} = (K1*S*C) + (K2*S) + (K3*C) + K4,$$

where S represents motor speed, C is the desired air flow rate, and K1–K4 are constants representing air flow, torque, pressure, and speed characteristics of the blower and are derived for the particular blower operated by the motor;

generating a control signal which is a function of the calculated torque and the current drawn by the motor and supplying the control signal to a switch means which controls the voltage applied to the motor, the voltage to the motor in response to the control signal being sufficient for the motor to produce the calculated torque.

19. In a method of controlling the operation of a blower motor for an air handling system to provide a substantially constant air flow over a wide range of operating conditions, the method comprising operating a blower having a predetermined set of operating characteristics by a blower motor to which a voltage is supplied, sensing the operating speed and current of the motor and providing respective output signals representative thereof, and establishing a desired air flow rate and providing a flow rate signal representative thereof, the improvement comprising:

processing the motor speed and flow rate signals to determine a torque required to be produced by the motor to produce the desired air flow rate to be produced by the blower;

producing a control signal for operating the motor which is a function of the calculated torque and the sensed motor current; and, supplying the control signal to a switch means for the switch means to supply a voltage to the motor sufficient for the motor to produce the calculated torque.

* * * * *

UNITED STATES PATENT AND TRADEMARK OFFICE
CERTIFICATE OF CORRECTION

PATENT NO : 5,736,823
DATED : April 7, 1998
INVENTOR(S) : Craig J. Nordby et al.

It is certified that error appears in the above-identified patent and that said Letters Patent are hereby corrected as shown below:

Col. 2, line 27 delete "double"

Col. 4, line 58 delete "double"

Col. 4, line 65 delete "double" (both occurrences)

Col. 6, line 1 delete "double

IN THE CLAIMS:

Col. 9, line 3
 replace "dram"
 with --drawn--.

Signed and Sealed this

Ninth Day of June, 1998

Attest:

BRUCE LEHMAN

Attesting Officer

Commissioner of Patents and Trademarks